US012654441B2

(12) United States Patent
Lee et al.

(10) Patent No.: US 12,654,441 B2
(45) Date of Patent: Jun. 16, 2026

(54) PRINTING DEVICE AND METHOD FOR CONTROLLING THE SAME

(71) Applicant: Samsung Display Co., LTD., Yongin-si (KR)

(72) Inventors: Gwangteak Lee, Yongin-si (KR); Jonghyeon Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 232 days.

(21) Appl. No.: 18/316,857

(22) Filed: May 12, 2023

(65) Prior Publication Data

US 2024/0051290 A1      Feb. 15, 2024

(30) Foreign Application Priority Data

Aug. 9, 2022      (KR) ........................ 10-2022-0099364

(51) Int. Cl.
| | |
|---|---|
| *B41J 2/045* | (2006.01) |
| *H02M 1/08* | (2006.01) |
| *H02M 3/00* | (2006.01) |

(52) U.S. Cl.
CPC ......... *B41J 2/0455* (2013.01); *B41J 2/04581* (2013.01); *H02M 1/08* (2013.01); *H02M 3/01* (2021.05)

(58) Field of Classification Search
CPC .. B41J 2/0455; B41J 2/04581; B41J 2/04541; B41J 2/095; B41J 2/14; B41J 2002/061; B41J 2/04503; B41J 2/04505; B41J 2/04506; B41J 2/04508; B41J 2/0451; B41J 2/04513; B41J 2/04515; B41J 2/0452; B41J 2/04525; B41J 2/04526; B41J 2/04528; B41J 2/04531; B41J 2/04535; B41J 2/04536; B41J 2/04538; B41J 2/0454; B41J 2/04545; B41J 2/04548; B41J 2/04551; B41J 2/04553; B41J 2/04555; B41J 2/04556; B41J 2/04558; B41J 2/0456; B41J 2/04561; B41J 2/04563; B41J 2/04565; B41J 2/04566; B41J 2/04568; B41J 2/0457; B41J 2/04571; B41J 2/04573; B41J 2/0459; B41J 2/04591; B41J 2/04596; B41J 2/04598; H02M 1/08; H02M 3/01; H02M 1/0058; H02M 7/538; H02M 7/4815
See application file for complete search history.

(56) References Cited

FOREIGN PATENT DOCUMENTS

| | | |
|---|---|---|
| KR | 10-0492106 B1 | 6/2005 |
| KR | 10-1296932 B1 | 8/2013 |
| KR | 10-1466058 B1 | 12/2014 |
| KR | 10-1982826 B1 | 5/2019 |

*Primary Examiner* — Kristal Feggins
(74) *Attorney, Agent, or Firm* — Womble Bond Dickinson (US) LLP

(57) ABSTRACT

A printing device includes: an AC power source configured to generate power having a first frequency; a resonance circuit connected to the AC power source, including at least one inductor and at least one capacitor, and having a resonance frequency that is equal to the first frequency; and a nozzle connected to the resonance circuit and configured to discharge an ink droplet onto a substrate.

14 Claims, 9 Drawing Sheets

PRINTING DEVICE AND METHOD FOR CONTROLLING THE SAME

CROSS-REFERENCE TO RELATED APPLICATION

The present application claims priority to and the benefit of Korean Patent Application No. 10-2022-0099364 filed in the Korean Intellectual Property Office on Aug. 9, 2022, the entire content of which is incorporated herein by reference.

BACKGROUND

1. Field

Aspects of some embodiments of the present disclosure relate to a printing device and a method for controlling the same.

2. Description of the Related Art

An inkjet technology may be used in various fields other than printers. The printing technology that discharges ink droplets from the nozzle is being developed gradually to improve precision of the printing.

In a piezoelectric driving method, when electricity is supplied to a piezoelectric element, a pressure is applied to the ink and the ink droplets are discharged from the nozzle. However, because the piezoelectric driving method discharges the ink by applying the pressure, the size of the ink droplet may be limited due to the size of the nozzle interior diameter and a surface tension.

An electrohydrodynamic (EHD) injection method to overcome this limitation is a method in which the ink droplets are discharged by applying a high voltage to the nozzle and applying a ground voltage to a lower substrate to generate an electric field between the nozzle and the lower substrate.

The above information disclosed in this Background section is only for enhancement of understanding of the background and therefore the information discussed in this Background section does not necessarily constitute prior art.

SUMMARY

Aspects of some embodiments of the present disclosure include a printing device that may apply a high voltage to the EHD printing type nozzle.

In the printing device of the EHD printing method, according to some embodiments, a printing device may be capable of relatively improving an amplitude gain and a response characteristic of the voltage applied to the nozzle with respect to the input voltage.

A printing device according to some embodiments includes an AC power source having a first frequency; a resonance circuit connected to the AC power source, including at least one inductor and at least one capacitor, and having a resonance frequency that is the same as the first frequency; and a nozzle connected to the resonance circuit and discharging an ink droplet onto a substrate.

According to some embodiments, the resonance circuit may include an inductor and a capacitor coupled in series, one terminal of the inductor may be connected to the AC power source, the other terminal of the inductor may be connected to one terminal of the capacitor and the nozzle, and the other terminal of the capacitor may be connected to a ground and the substrate.

According to some embodiments, the resonance circuit may include a first inductor and a second inductor, and a capacitor, which are coupled in series, one terminal of the first inductor may be connected to the AC power source, the other terminal of the first inductor may be connected to one terminal of the second inductor, the other terminal of the second inductor may be connected to one terminal of the capacitor, and the other terminal of the capacitor may be connected to a ground.

According to some embodiments, one terminal of the second inductor may be electrically connected to the nozzle, and the other terminal of the capacitor may be electrically connected to the substrate.

According to some embodiments, one terminal of the capacitor may be electrically connected to the nozzle, and the other terminal of the capacitor may be electrically connected to the substrate.

According to some embodiments, one terminal of the second inductor may be electrically connected to the nozzle, and the other terminal of the second inductor may be electrically connected to the substrate.

A printing device according to some embodiments of the present invention includes a DC power source; a resonance circuit including at least one inductor and at least one capacitor, and having a resonance frequency that is a first frequency; a nozzle connected to the resonance circuit and discharging ink droplets to a substrate; a first transistor turned on according to a control signal having the same frequency as the first frequency and transmitting the DC power source to the resonance circuit; and a second transistor that connects the input terminals of the resonance circuit to the ground when being turned on depending on the inverted signal from the control signal.

According to some embodiments, one terminal of the first transistor may be connected to the DC power source, the other terminal of the first transistor may be connected to one of the input terminals of the resonance circuit and one terminal of the second transistor, and the other terminal of the second transistor may be connected to the other of the input terminals of the resonance circuit and the ground.

According to some embodiments, when the control signal is an on-level signal, the first transistor may be turned on and the second transistor may be turned off, and when the control signal is an off-level signal, the second transistor may be turned on and the first transistor may be turned off.

According to some embodiments, the resonance circuit may include an inductor and a capacitor coupled in series to each other, one terminal of the inductor may be connected to the other terminal of the first transistor, the other terminal of the inductor may be connected to one terminal of the capacitor, and the other terminal of the capacitor may be connected to the ground.

According to some embodiments, the resonance circuit may include first and second inductors and a capacitor coupled in series to each other, one terminal of the first inductor may be connected to the other terminal of the first transistor, the other terminal of the first inductor may be connected to one terminal of the second inductor, the other terminal of the second inductor may be connected to one terminal of the capacitor, and the other terminal of the capacitor may be connected to the ground.

According to some embodiments, one terminal of the second inductor may be electrically connected to the nozzle, and the other terminal of the capacitor may be electrically connected to the substrate.

According to some embodiments, one terminal of the capacitor may be electrically connected to the nozzle, and the other terminal of the capacitor may be electrically connected to the substrate.

According to some embodiments, one terminal of the second inductor may be electrically connected to the nozzle, and the other terminal of the second inductor may be electrically connected to the substrate.

According to some embodiments, in a control method for controlling a printing device including a DC power source, a resonance circuit including at least one inductor and at least one capacitor and having a resonance frequency that is a first frequency, a nozzle discharging an ink droplet on a substrate, and first and second transistors for supplying the DC power source to the resonance circuit according to a control signal, includes: applying a control signal having a second frequency as a switching frequency; determining whether the second frequency is the same as the first frequency based on an output terminal voltage signal of the resonance circuit; and increasing or decreasing the switching frequency to control the switching frequency to be equal to the first frequency if the second frequency is not equal to the first frequency.

According to some embodiments, the applying may include: supplying the DC power source by the input terminals of the resonance circuit when the first transistor is turned on by the control signal; outputting an inverted signal from the control signal through an inverter; and connecting the input terminals of the resonance circuit to a ground if the second transistor is turned on by the inverted signal.

According to some embodiments, the applying may include connecting one terminal of an inductor to one of the input terminals of the resonance circuit, connecting one terminal of a capacitor to the other terminal of the inductor, and connecting the other of the input terminals to the other terminal of the capacitor.

According to some embodiments, the applying may include connecting one terminal of the first inductor to one of the input terminals of the resonance circuit, connecting one terminal of a second inductor to the other terminal of the first inductor, connecting one terminal of a capacitor to the other terminal of the second inductor, connecting the other of the input terminals to the other terminal of the capacitor, and connecting one terminal of the second inductor to one of the output terminals of the resonance circuit, and connecting the other terminal of the capacitor to the other of the output terminals.

According to some embodiments, the applying may include connecting one terminal of a first inductor to one of the input terminals of the resonance circuit, connecting one terminal of a second inductor to the other terminal of the first inductor, connecting one terminal of a capacitor to the other terminal of the second inductor, connecting the other of the input terminals to the other terminal of the capacitor; and connecting both terminals of the capacitor to the output terminals of the resonance circuit.

According to some embodiments, the applying may include connecting one terminal of the first inductor to one of the input terminals of the resonance circuit, connecting one terminal of the second inductor to the other terminal of the first inductor, connecting one terminal of the capacitor to the other terminal of the second inductor, connecting the other of the input terminals to the other terminal of the capacitor, and connecting both terminals of the second inductor to the output terminals of the resonance circuit.

According to some embodiments of the present disclosure, it may be possible to improve the amplitude gain and the response characteristic of the voltage applied to the nozzle for the input voltage by using the resonance circuit.

According to some embodiments of the present disclosure, it may be possible to implement the driving voltage of a high voltage applied to the nozzle.

According to some embodiments of the present disclosure, it may be possible to prevent or reduce the occurrence of system interference due to the use of the voltage source of high voltage.

According to some embodiments of the present disclosure, it may be possible to improve the slow response characteristic according to the limit of using the voltage source of a high voltage.

According to some embodiments of the present disclosure, it may be possible to increase the discharge resolution by improving the low amplitude gain according to the limit of using the voltage source of high voltage.

BRIEF DESCRIPTION OF THE DRAWINGS

FIG. 4 is a circuit diagram showing an example in which a resonance circuit according to some embodiments is implemented as a series LC circuit according to some embodiments.

FIG. 5 is a circuit diagram showing an example in which a resonance circuit according to some embodiments is implemented as a series LLC circuit according to some embodiments.

FIG. 6 is a circuit diagram showing an example in which a resonance circuit according to some embodiments is implemented as a series LLC circuit according to some embodiments.

FIG. 7 is a circuit diagram showing an example in which a resonance circuit according to some embodiments is implemented as a series LLC circuit according to some embodiments.

DETAILED DESCRIPTION

Figure 1:
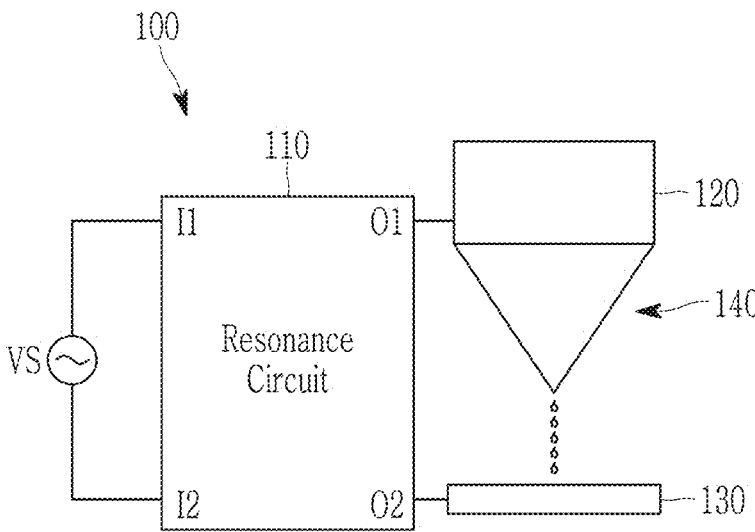
FIG. 1 is a block diagram schematically showing a printing device according to some embodiments.

Hereinafter, aspects of some embodiments of the present invention are described in more detail with reference to the accompanying drawings so that those skilled in the art to which the present invention pertains may practice the present invention. The present invention may be implemented in various different forms and is not limited to the embodiments provided herein.

A portion unrelated to the description is omitted in order to obviously describe the present invention, and the same or similar components are denoted by the same reference numeral throughout the present specification.

In addition, the size and thickness of each component shown in the accompanying drawings are arbitrarily shown for convenience of explanation, and therefore, the present invention is not necessarily limited to contents shown in the drawings. In the drawings, the thickness of layers, films, panels, regions, etc., are exaggerated for clarity. In addition, the thicknesses of some layers and regions are exaggerated in the drawings for convenience of explanation.

It will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, when an element is referred to as being "on" or "above" a reference element, the element may be positioned on or below the reference element, and may not necessarily be "on" or "above" the reference element toward an opposite direction of gravity.

In addition, unless explicitly described to the contrary, the word "comprise", and variations such as "comprises" or "comprising", will be understood to imply the inclusion of stated elements but not the exclusion of any other elements.

Further, throughout the specification, an expression "on a plane" may indicate a case where a target is viewed from the top, and an expression "on a cross-section" may indicate a case where a cross-section of a target taken along a vertical direction is viewed from the side.

A program implemented as a set of instructions embodying a control algorithm required to control another configuration may be installed in a configuration for controlling another configuration under a specific control condition among configurations according to some embodiments. The control configuration may process input data and stored data according to an installed program to generate output data. The control configuration may include a non-volatile memory to store a program and a memory to store data.

Hereinafter, an electrohydrodynamic (EHD) inkjet nozzle using a passive element resonance circuit will be described in more detail with reference to the drawings below.

FIG. 1 is a block diagram schematically showing a printing device according to some embodiments.

Referring to FIG. 1, a printing device 100 may include a resonance circuit 110, a nozzle 120, and a substrate 130.

The resonance circuit 110 may amplify the AC voltage applied from the input power source VS. The resonance circuit 110 may be electrically connected to the nozzle 120. The resonance circuit 110 may apply a voltage to the nozzle 120 so that the EHD phenomenon occurs. According to some embodiments, the EHD printing method is a printing technology that discharges the ink by an electric field formed between the nozzle 120 and the substrate 130 by applying a voltage to the nozzle 120 and the ground voltage to the substrate 130. According to some embodiments, a technique for improving a voltage gain and an amplitude gain by applying an amplified high voltage by using the resonance circuit 110 to the nozzle of the EHD printing method is described.

The resonance circuit 110 may include an input terminal I1 connected to the input power source VS and an input terminal 12 connected to a ground. The resonance circuit 110 may include input terminals I1 and 12 electrically connected to the nozzle 120 and output terminals O1 and O2 electrically connected to the substrate 130. The resonance circuit 110 may include a series LC circuit or a series LLC circuit.

The nozzle 120 may discharge ink droplets 140 to be printed on the substrate 130. For example, the nozzle 120 may discharge the ink droplet 140 onto the substrate 130 by the voltage transmitted by the resonance circuit 110. The nozzle 120 may include a conductive or insulating material.

A pneumatic member may be connected to the nozzle 120 to provide an air pressure to the nozzle 120. The ink may be supplied to the nozzle 120 by the air pressure, and the nozzle 120 may be charged. When the ink is discharged from the nozzle 120, the pneumatic member may assist the ink discharge from the nozzle 120 by providing the air pressure to the ink.

The substrate 130 may be a conductive or insulating substrate positioned on the lower side of the nozzle. When the substrate 130 is a conductive substrate, the substrate 130 may include a metal material or a semiconductor material. For example, the substrate 130 may be a silicon substrate. When the substrate 130 is an insulating substrate, it may include, for example, a ceramic material or a polymer material.

Figure 2:
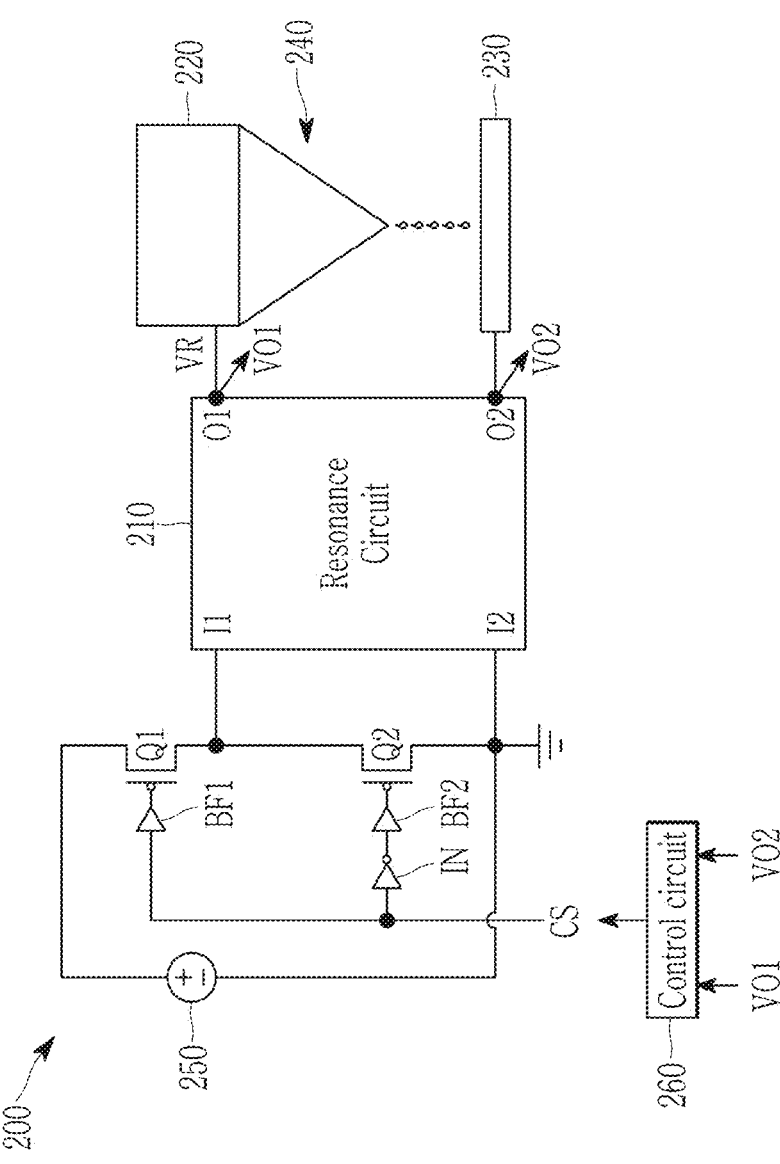
FIG. 2 is a circuit diagram showing an example of implementing a power source and a transistor in a printing device according to some embodiments.

FIG. 2 is a circuit diagram showing an example of implementing a power source and a transistor in a printing device according to some embodiments.

Referring to FIG. 2, a printing device 200 may include a resonance circuit 210, a nozzle 220, a substrate 230, a voltage source 250, a first transistor Q1, a second transistor Q2, a first buffer BF1, a second buffer BF2, and an inverter IN.

The voltage source 250 may be a power source that supplies a DC voltage.

One terminal of the first transistor Q1 may be connected to one terminal of the voltage source 250, and the other terminal of the first transistor Q1 may be connected to one terminal of the second transistor Q2 and the input terminal I1 of the resonance circuit 210. The input terminal of the first buffer BF1 may be connected to the control signal CS, and the output terminal of the first buffer BF1 may be connected to the gate electrode of the first transistor Q1. The other terminal of the second transistor Q2 may be connected to the other terminal of the voltage source 250 and the input terminal 12 of the resonance circuit 210. The other terminal of the second transistor Q2 may be connected to the ground. The input terminal of the inverter IN may be connected to the control signal CS, and the output terminal of the inverter IN may be connected to the input terminal of the second buffer BF2. The output terminal of the second buffer BF2 may be connected to the gate electrode of the second transistor Q2. The control signal CS may be coupled in parallel to the first buffer BF1 and the inverter IN.

The switching operation of the first transistor Q1 and the second transistor Q2 may be controlled according to the control signal CS. When the control signal CS is an on-level signal, the first transistor Q1 may be turned on and the second transistor Q2 may be turned off. When the control signal CS is an off-level signal, the first transistor Q1 may be turned off, and the second transistor Q2 may be turned on.

The first transistor Q1 may be turned on by the control signal CS supplied through the first buffer BF1, and the second transistor Q2 may be turned on by the control signal CS supplied through the inverter IN and the second buffer BF2. Because an inverter is not connected to the input terminal of the first buffer BF1 and the inverter IN is connected to the input terminal of the second buffer BF2, the first transistor Q1 and the second transistor Q2 may be alternately turned on. When the first transistor Q1 is turned on and the second transistor Q2 is turned off, the voltage is applied to the resonance circuit 210 from the voltage source 250, when the second transistor Q2 is turned on and the first transistor Q1 is turned off, the input terminals I1 and 12 are in a short-circuited operation, and each of the input terminals I1 and 12 may be connected to the ground. When the second transistor Q2 is turned on and the first transistor Q1 is turned off, the ground voltage may be applied to the resonance circuit 210. The input power source VS of FIG. 1 may be implemented as the voltage source 250, the first transistor Q1, the second transistor Q2, the first buffer BF1, the second buffer BF2, and the inverter IN.

The nozzle 220 may discharge the ink droplets 240 onto the substrate 230 by the voltage transmitted by the resonance circuit 210.

The resonance circuit 210 may include passive elements. The passive elements may include at least one inductor and at least one capacitor. The resonance circuit 210 may output an output terminal voltage VR amplified by an amplitude gain of the voltage source 250 at the resonance frequency of the passive elements.

Hereinafter, the frequency of the control signal CS switched by the first transistor Q1 and the second transistor Q2 is referred to as a switching frequency fs, and the frequency at which the resonance circuit 210 resonates and the impedance becomes the maximum or minimum of the resonance circuit 210 is referred to as a resonance frequency fr.

According to some embodiments, the switching frequency fs of the control signal CS may be controlled to be the same as the resonance frequency fr of the resonance circuit 210. For example, the switching frequency fs of the control signal CS may be controlled to be the same frequency as the resonance frequency fr.

Referring to FIG. 2, the printing device 200 may further include a control circuit 260. The control circuit 260 may generate the control signal CS by receiving the output terminal voltage signals VO1 and VO2 from the output terminals O1 and O2 of the resonance circuit 210, respectively. Each of the output terminal voltage signals VO1 and VO2 may indicate a voltage of each of the output terminals O1 and O2 of the resonance circuit 210. The control circuit 260 may detect the resonance frequency fr based on the output terminal voltage signals VO1 and VO2 of the resonance circuit 210. The control circuit 260 may control the switching frequency fs to be equal to the resonance frequency fr.

Figure 3:
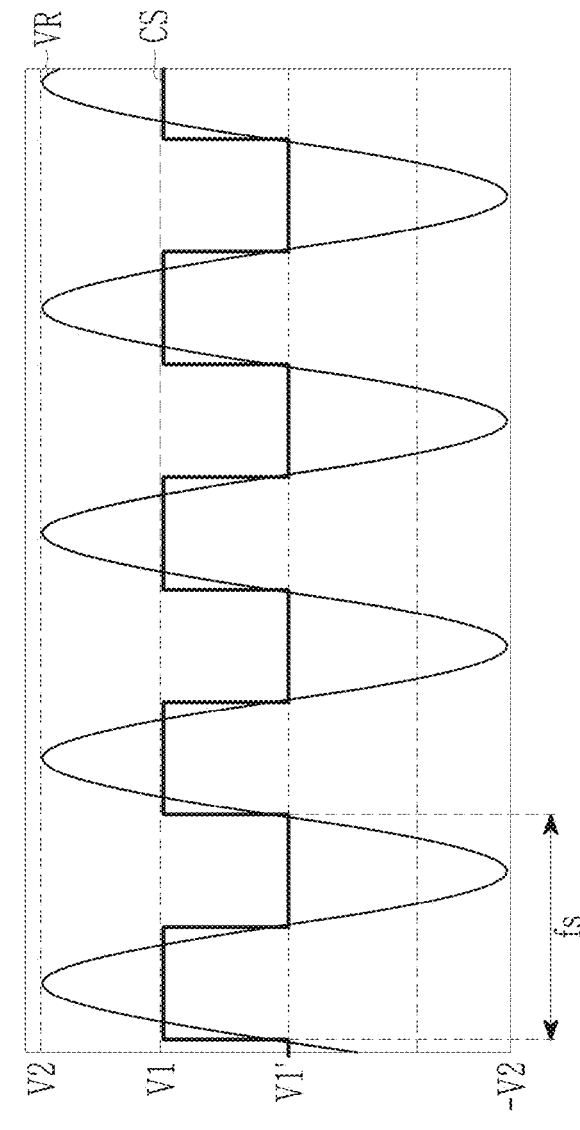
FIG. 3 is a waveform diagram showing an example showing a control signal and an output terminal voltage of a resonance circuit according to some embodiments.

FIG. 3 is a waveform diagram showing an example showing an output terminal voltage of a control signal and resonance circuit according to some embodiments.

Referring to FIG. 3, the control signal CS may be a square wave that switches between the voltage value V1 that may turn on the first transistor Q1 and the second transistor Q2 and the voltage value V1' that may turn off the first transistor Q1 and the second transistor Q2 with the switching frequency fs.

The output terminal voltage VR of the resonance circuit 210 may have a maximum value of V2 (V2 is a real number greater than or equal to 0) and a minimum value of −V2 and may be a sine wave having the resonance frequency fr.

The shape of the control signal CS and the output terminal voltage VR is not limited to the above description.

When the switching frequency fs of the control signal CS is equal to the resonance frequency fr, the resonance circuit 210 may have a maximum voltage gain V2/V1.

Hereinafter, each example of the resonance circuit 210 of FIG. 2 is reviewed with reference to FIG. 4 to FIG. 7.

Figure 4:
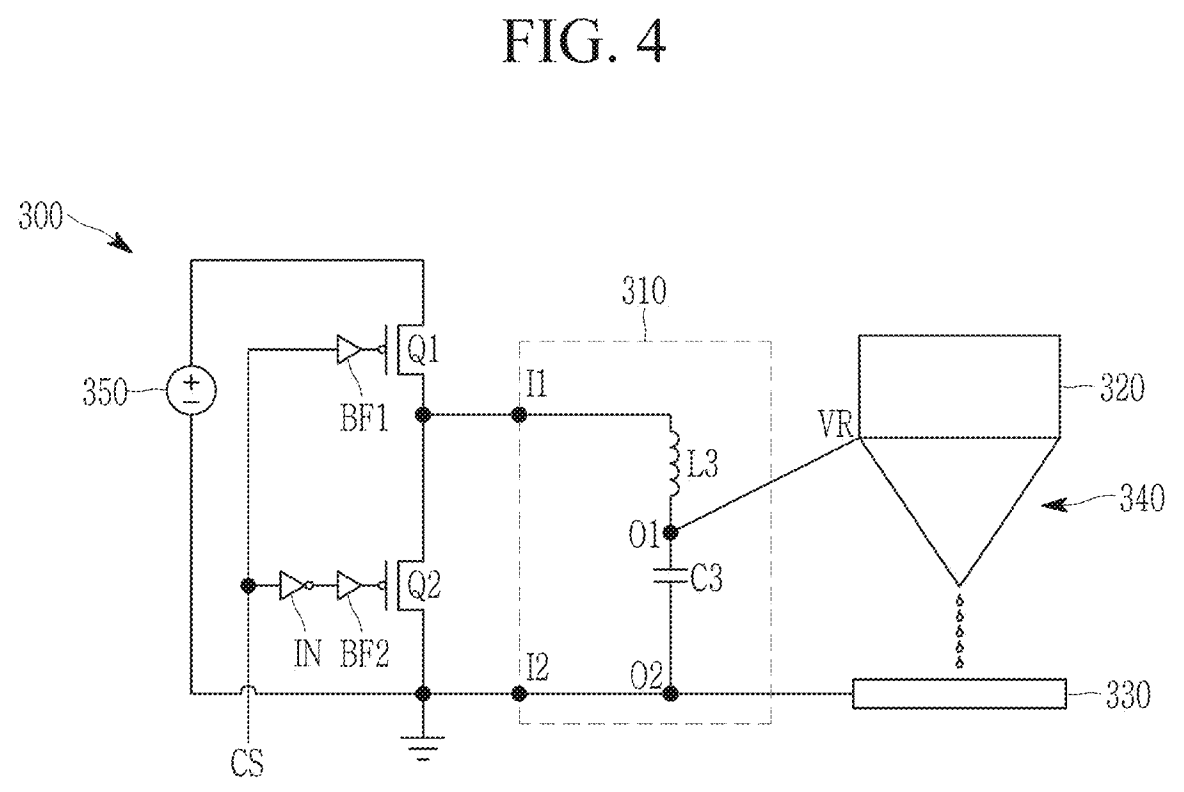

FIG. 4 is a circuit diagram showing an example in which a resonance circuit according to some embodiments is implemented as a series LC circuit.

Referring to FIG. 4, the printing device 300 may include a resonance circuit 310, a nozzle 320, a substrate 330, a voltage source 350, a first transistor Q1, a second transistor Q2, a first buffer BF1, a second buffer BF2, and an inverter IN. The resonance circuit 310 may include an inductor L3 and a capacitor C3.

One terminal of the first transistor Q1 may be connected to one terminal of the voltage source 350, and the other terminal of the first transistor Q1 may be connected to one terminal of the second transistor Q2 and one terminal of the inductor L3. The input terminal of the first buffer BF1 may be connected to the control signal CS, and the output terminal of the first buffer BF1 may be connected to the gate electrode of the first transistor Q1. The other terminal of inductor L3 may be connected to one terminal of the capacitor C3 and the nozzle 320. The other terminal of the second transistor Q2 may be connected to the other terminal of the voltage source 350, the other terminal of the capacitor C3, and the substrate 330. The input terminal I1 of the resonance circuit 310 may be connected to one terminal of the inductor L3, and the input terminal I2 of the resonance circuit 310 may be connected to the ground. The output terminal O1 of the resonance circuit 310 may be connected to one terminal of the capacitor C3, and the output terminal O2 of the resonance circuit 310 may be connected to the other terminal of the capacitor C3.

The other terminal of the second transistor Q2 may be connected to the ground. The input terminal of the inverter IN may be connected to the control signal CS, and the output terminal of the inverter IN may be connected to the input terminal of the second buffer BF2. The output terminal of the second buffer BF2 may be connected to the gate electrode of the second transistor Q2. The control signal CS may be coupled in parallel to the first buffer BF1 and inverter IN.

The switching operation of the first transistor Q1 and the second transistor Q2 may be controlled according to a control signal CS. When the control signal CS is an on-level signal, the first transistor Q1 may be turned on and the second transistor Q2 may be turned off. The control signal CS is an off-level signal, the first transistor Q1 may be turned off, and the second transistor Q2 may be turned on.

The first transistor Q1 may be turned on by the control signal CS supplied through the first buffer BF1, and the second transistor Q2 may be turned on by the control signal CS supplied through the inverter IN and the second buffer BF2. Because an inverter is not connected to the input terminal of the first buffer BF1 and the inverter IN is connected to the input terminal of the second buffer BF2, the first transistor Q1 and the second transistor Q2 may be alternately turned on. When the first transistor Q1 is turned on and the second transistor Q2 is turned off, the voltage may be applied from the voltage source 350 to the series connection between the inductor L3 and the capacitor C3. When the second transistor Q2 is turned on and the first transistor Q1 is turned off, the input terminals I1 and I2 may be short-circuited, and each of the input terminals I1 and I2 may be connected to the ground. When the second transistor Q2 is turned on and the first transistor Q1 is turned off, one terminal of the inductor L3 may be connected to the ground.

The nozzle 320 may discharge the ink droplets 340 onto the substrate 330 by the voltage applied to the capacitor C3.

The voltage source 350 may be a power source that supplies a DC voltage.

The resonance circuit 310 may output an output terminal voltage VR that amplifies the amplitude of the voltage source 350 by the amplitude gain at the resonance frequency of the inductor L3 and capacitor C3.

The resonance frequency fr of the resonance circuit 310 may be determined according to the inductance value of the inductor L3 and the capacitance value of the capacitor C3, and the switching frequency fs may be controlled according to the resonance frequency fr of the resonance circuit 310. If the switching frequency fs is controlled to be equal to the resonance frequency fr by the voltage resonance characteristic of the resonance circuit 310, the amplitude gain may be maximized. Because the amplitude of the output terminal voltage VR is a value obtained by multiplying the voltage of the voltage source 350 by the amplitude gain, the resonance circuit 310 may transmit a high voltage to the nozzle 320.

Figure 5:
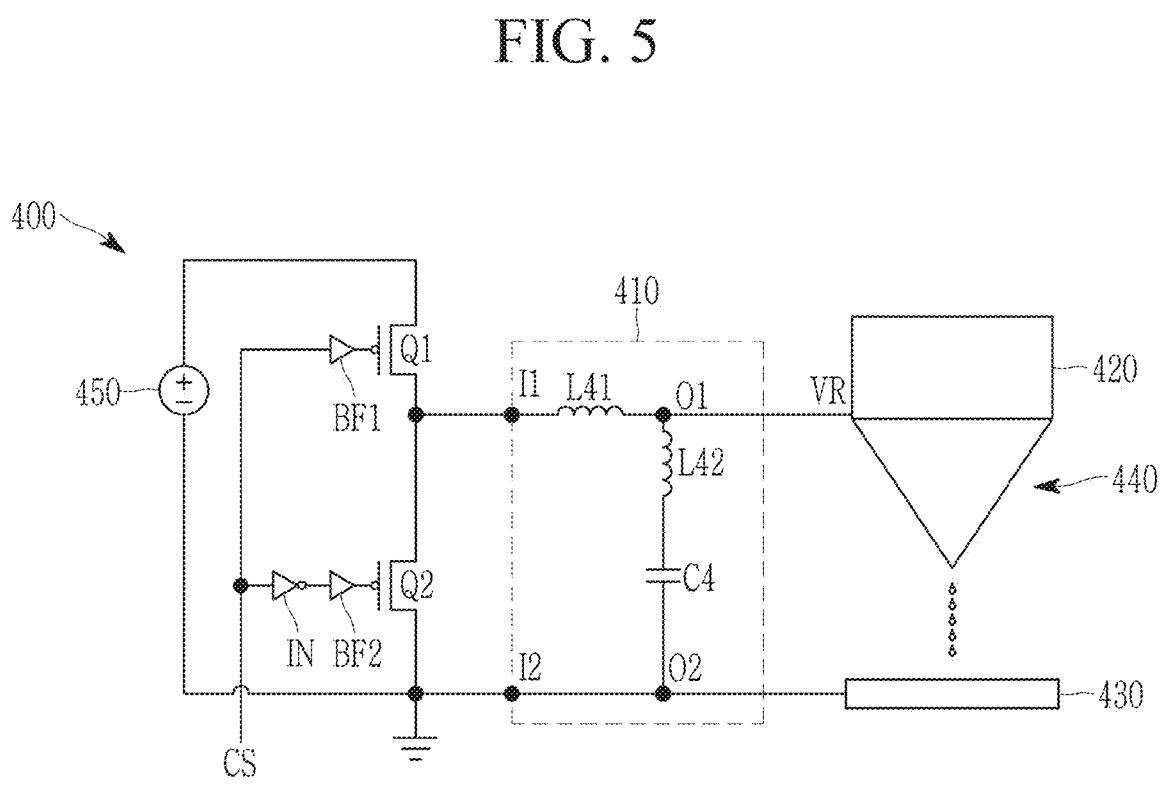

FIG. 5 is a circuit diagram showing an example in which a resonance circuit according to some embodiments is implemented as a series LLC circuit.

Referring to FIG. 5, the printing device 400 may include a resonance circuit 410, a nozzle 420, a substrate 430, a voltage source 450, a first transistor Q1, a second transistor Q2, a first buffer BF1, a second buffer BF2, and an inverter IN. The resonance circuit 410 may include a first inductor L41, a second inductor L42, and a capacitor C4.

One terminal of the first transistor Q1 may be connected to one terminal of the voltage source 450, and the other terminal of the first transistor Q1 may be connected to one terminal of the second transistor Q2 and one terminal of the first inductor L41. The input terminal of the first buffer BF1 may be connected to the control signal CS, and the output terminal of the first buffer BF1 may be connected to the gate electrode of the first transistor Q1. The other terminal of the first inductor L41 may be connected to one terminal and nozzle 420 of the second inductor L42. The other terminal of second inductor L42 may be connected to one terminal of the capacitor C4. The input terminal I1 of the resonance circuit 410 may be connected to one terminal of the first inductor L41, and the input terminal 12 of the resonance circuit 410 may be connected to the ground. The output terminal O1 of the resonance circuit 410 may be connected to one terminal of the second inductor L42, and the output terminal O2 of the resonance circuit 410 may be connected to the other terminal of the capacitor C4.

The other terminal of the second transistor Q2 may be connected to the other terminal of the voltage source 450, the other terminal of the capacitor C4, and the substrate 430. The other terminal of the second transistor Q2 may be connected to the ground. The input terminal of the inverter IN may be connected to the control signal CS, and the output terminal of the inverter IN may be connected to the input terminal of the second buffer BF2. The output terminal of the second buffer BF2 may be connected to the gate electrode of the second transistor Q2. The control signal CS may be coupled in parallel to the first buffer BF1 and the inverter IN.

The switching operation of the first transistor Q1 and the second transistor Q2 may be controlled according to a control signal CS. When the control signal CS is an on-level signal, the first transistor Q1 may be turned on and the second transistor Q2 may be turned off. When the control signal CS is an off-level signal, the first transistor Q1 may be turned off and the second transistor Q2 may be turned on.

The first transistor Q1 may be turned on by the control signal CS supplied through the first buffer BF1, and the second transistor Q2 may be turned on by the control signal CS supplied through the inverter IN and the second buffer BF2. Because an inverter is not connected to the input terminal of the first buffer BF1 and the inverter IN is connected to the input terminal of the second buffer BF2, the first transistor Q1 and the second transistor Q2 may be alternately turned on. When the first transistor Q1 is turned on and the second transistor Q2 is turned off, a voltage may be applied from a voltage source 450 to the series connection of the first inductor L41, the second inductor L42, and the capacitor C4. When the second transistor Q2 is turned on and the first transistor Q1 is turned off, the input terminals I1 and 12 may be short-circuited, and each of the input terminals I1 and 12 may be connected to the ground. When the second transistor Q2 is turned on and the first transistor Q1 is turned off, one terminal of the first inductor L41 may be connected to the ground.

The nozzle 420 may discharge the ink droplets 440 onto the substrate 430 by the voltage applied to the series connection circuit of the second inductor L42 and the capacitor C4.

The voltage source 450 may be a power source that supplies a DC voltage.

The resonance circuit 410 may output an output terminal voltage VR that amplifies the amplitude of the voltage source 450 by the amplitude gain at the resonance frequencies of the first inductor L41, the second inductor L42, and the capacitor C4.

The resonance frequency fr of the resonance circuit 410 may be determined according to the inductance value of each of the first inductor L41 and the second inductor L42, and the capacitance value of the capacitor C4 and the switching frequency fs may be controlled according to the resonance frequency fr of the resonance circuit 410. If the switching frequency fs is controlled to be equal to the resonance frequency fr by the voltage resonance characteristic of the resonance circuit 410, the amplitude gain may be maximized. Because the amplitude of the output terminal voltage VR is the value multiplied by the amplitude gain to the voltage of the voltage source 450, the resonance circuit 410 can deliver a high voltage to the nozzle 420.

Figure 6:
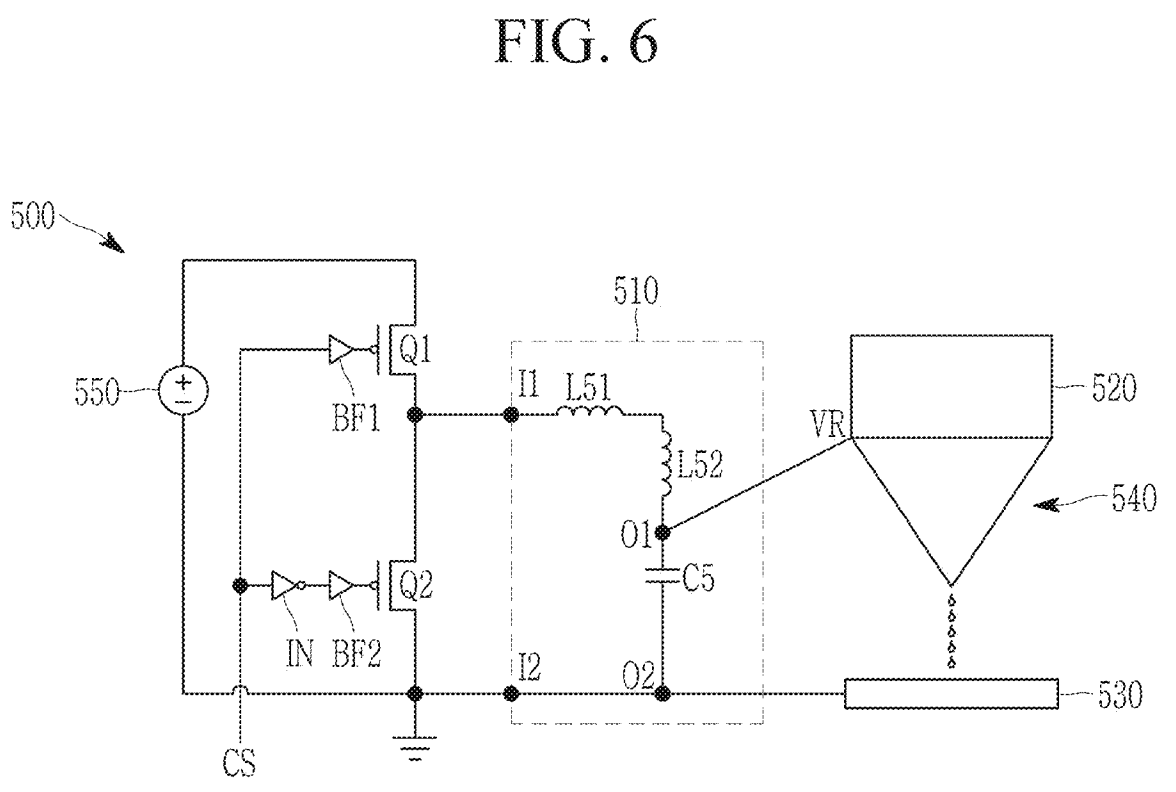

FIG. 6 is a circuit diagram showing an example in which a resonance circuit according to some embodiments is implemented as a series LLC circuit.

Referring to FIG. 6, a printing device 500 may include a resonance circuit 510, a nozzle 520, a substrate 530, a voltage source 550, a first transistor Q1, a second transistor Q2, a first buffer BF1, a second buffer BF2, and an inverter IN. The resonance circuit 510 may include a first inductor L51, a second inductor L52, and a capacitor C5.

One terminal of the first transistor Q1 may be connected to one terminal of the voltage source 550, and the other terminal of the first transistor Q1 may be connected to one terminal of the second transistor Q2 and one terminal of the first inductor L51. The input terminal of the first buffer BF1 may be connected to the control signal CS, and the output terminal of the first buffer BF1 may be connected to the gate electrode of the first transistor Q1. The other terminal of the first inductor L51 may be connected to one terminal of the second inductor L52. The other terminal of the second inductor L52 may be connected to one terminal of the capacitor C5 and the nozzle 520. The other terminal of the second transistor Q2 may be connected to the other terminal of the voltage source 550, the other terminal of the capacitor C5, and the substrate 530. The input terminal I1 of the resonance circuit 510 may be connected to one terminal of the first inductor L51, and the input terminal 12 of the resonance circuit 510 may be connected to the ground. The output terminal O1 of the resonance circuit 510 may be connected to one terminal of the capacitor C5, and the output terminal O2 of the resonance circuit 510 may be connected to the other terminal of the capacitor C5.

The other terminal of the second transistor Q2 may be connected to the ground. The input terminal of the inverter IN may be connected to the control signal CS, and the output terminal of the inverter IN may be connected to the input terminal of the second buffer BF2. The output terminal of the second buffer BF2 may be connected to the gate electrode of the second transistor Q2. The control signal CS may be coupled in parallel to the first buffer BF1 and the inverter IN.

The switching operation of the first transistor Q1 and the second transistor Q2 may be controlled according to the control signal CS. When the control signal CS is an on-level signal, the first transistor Q1 may be turned on and the second transistor Q2 may be turned off. When the control signal CS is an off-level signal, the first transistor Q1 may be turned off and the second transistor Q2 may be turned on.

The first transistor Q1 may be turned on by the control signal CS supplied through the first buffer BF1, and the second transistor Q2 may be turned on by the control signal CS supplied through the inverter IN and the second buffer BF2. Because the inverter is not connected to the input terminal of the first buffer BF1 and the inverter IN is connected to the input terminal of the second buffer BF2, the first transistor Q1 and the second transistor Q2 may be alternately turned on. When the first transistor Q1 is turned on and the second transistor Q2 is turned off, a voltage may be applied from the voltage source 550 to the series connection of the first inductor L51, the second inductor L52, and the capacitor C5. When the second transistor Q2 is turned on and the first transistor Q1 is turned off, the input terminals I1 and 12 may be short-circuited, and each of the input terminals I1 and 12 may be connected to the ground. When the second transistor Q2 is turned on and the first transistor Q1 is turned off, one terminal of the first inductor L51 may be connected to the ground.

The nozzle 520 may discharge the ink droplet 540 onto the substrate 530 by the voltage applied to the capacitor C5.

The voltage source 550 may be a power source that supplies a DC voltage.

The resonance circuit 510 may output an output terminal voltage VR in which the amplitude of the voltage source 550 is amplified by the amplitude gain at the resonance frequencies of the first inductor L51, the second inductor L52, and the capacitor C5.

The resonance frequency fr of the resonance circuit 510 may be determined according to the inductance value of each of the first inductor L51 and the second inductor L52 and the capacitance value of the capacitor C5, and the switching frequency fs may be controlled according to the resonance frequency fr of the resonance circuit 510.

If the switching frequency fs is controlled to be equal to the resonance frequency fr by the voltage resonance characteristic of the resonance circuit 510, the amplitude gain may be maximized. Because the amplitude of the output terminal voltage VR is a value multiplied by the amplitude gain to the voltage of the voltage source 550, the resonance circuit 510 may transmit a high voltage to the nozzle 520.

Figure 7:
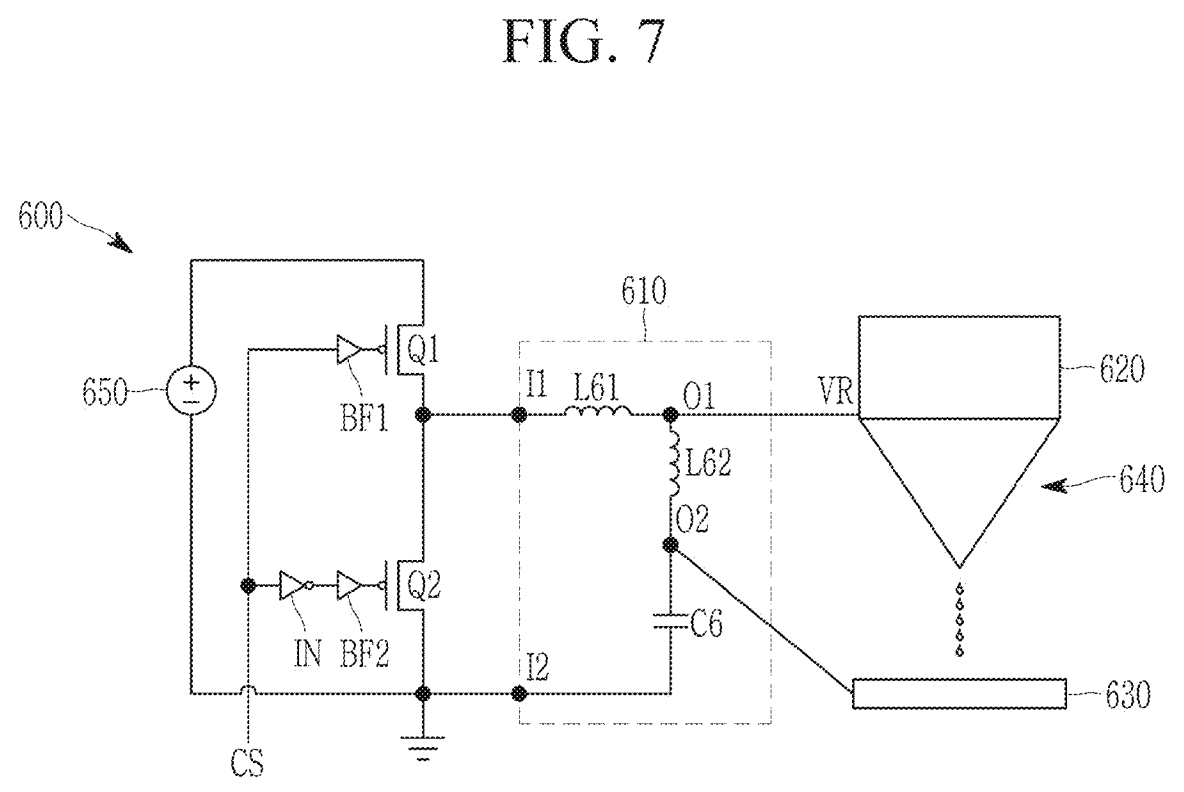

FIG. 7 is a circuit diagram showing an example in which a resonance circuit according to some embodiments is implemented is a series LLC circuit.

Referring to FIG. 7, a printing device 600 may include a resonance circuit 610, a nozzle 620, substrate 630, a voltage source 650, a first transistor Q1, a second transistor Q2, a first buffer BF1, a second buffer BF2, and an inverter IN. The resonance circuit 610 may include a first inductor L61, a second inductor L62, and a capacitor C6.

One terminal of the first transistor Q1 may be connected to one terminal of a voltage source 650, and the other terminal of the first transistor Q1 may be connected to one terminal of the second transistor Q2 and one terminal of the first inductor L61. The input terminal of the first buffer BF1 may be connected to the control signal CS, and the output terminal of the first buffer BF1 may be connected to the gate electrode of the first transistor Q1. The other terminal of the first inductor L61 may be connected to one terminal and nozzle 620 of the second inductor L62. The other terminal of second inductor L62 may be connected to one terminal of capacitor C6 and substrate 630. The input terminal I1 of the resonance circuit 610 may be connected to one terminal of the first inductor L61, and the input terminal 12 of the resonance circuit 610 may be connected to the ground. The output terminal O1 of the resonance circuit 610 may be connected to one terminal of the second inductor L62, and the output terminal O2 of the resonance circuit 510 may be connected to the other terminal of the second inductor L62.

The other terminal of the second transistor Q2 may be connected to the other terminal of the voltage source 650 and the other terminal of the capacitor C6. The other terminal of the second transistor Q2 may be connected to the ground. The input terminal of the inverter IN may be connected to the control signal CS, and the output terminal of the inverter IN may be connected to the input terminal of the second buffer BF2. The output terminal of the second buffer BF2 may be connected to the gate electrode of the second transistor Q2. The control signal CS may be coupled in parallel to the first buffer BF1 and inverter IN.

The switching operation of the first transistor Q1 and the second transistor Q2 may be controlled according to a control signal CS. When the control signal CS is an on-level signal, the first transistor Q1 may be turned on and the second transistor Q2 may be turned off. When the control signal CS is an off-level signal, the first transistor Q1 may be turned off, and the second transistor Q2 may be turned on.

The first transistor Q1 may be turned on by the control signal CS supplied through the first buffer BF1, and the second transistor Q2 may be turned on by the control signal CS supplied through the inverter IN and the second buffer BF2. Because the inverter is not connected to the input terminal of the first buffer BF1 and the inverter IN is connected to the input terminal of the second buffer BF2, the first transistor Q1 and the second transistor Q2 may be alternately turned on. When the first transistor Q1 is turned on and the second transistor Q2 is turned off, a voltage may be applied from the voltage source 650 to the series connection of the first inductor L61, the second inductor L62, and the capacitor C6. When the second transistor Q2 is turned on and the first transistor Q1 is turned off, the input terminals I1 and 12 may be short-circuited, and each of the input terminals I1 and 12 may be connected to the ground. When the second transistor Q2 is turned on and the first transistor Q1 is turned off, one terminal of the first inductor L61 may be connected to the ground.

The nozzle 620 may discharge the ink droplet 640 onto the substrate 630 by using the EHD phenomenon by the voltage applied to the second inductor L62.

The voltage source 650 may be a power source that supplies a DC voltage.

The resonance circuit 610 may output the output terminal voltage VR that amplifies the amplitude of the voltage source 650 by the amplitude gain at the resonance frequencies of the first inductor L61, the second inductor L62, and the capacitor C6.

The resonance frequency fr of the resonance circuit 610 may be determined according to the inductance value of each of the first inductor L61 and the second inductor L62, and the capacitance value of the capacitor C6 and the switching frequency fs may be controlled according to the resonance frequency fr of the resonance circuit 610. If the switching frequency fs is controlled to be equal to the resonance frequency fr by the voltage resonance characteristic of the resonance circuit 610, the amplitude gain may be maximized. Because the amplitude of the output terminal voltage VR is a value multiplied by the amplitude gain to the voltage of the voltage source 650, the resonance circuit 610 may transmit a high voltage to the nozzle 620.

Figures 8A, 8B:
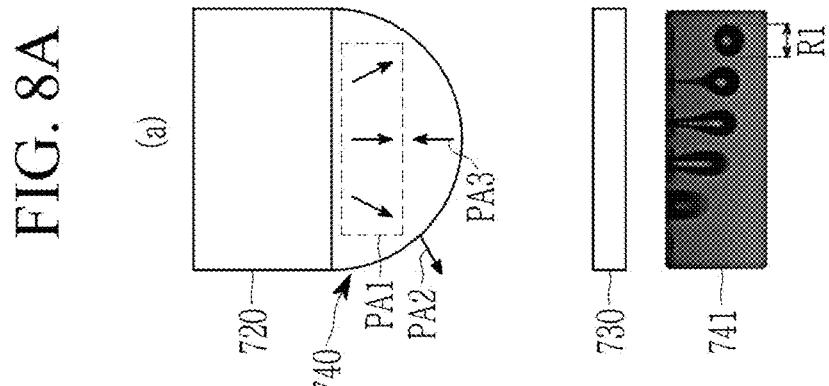
FIGS. 8A and 8B are diagrams for explaining a shape of an ink droplet discharged by a nozzle and forces applied to an ink droplet according to some embodiments.

FIGS. 8A and 8B are diagrams for explaining a shape of an ink droplet discharged by a nozzle according to some embodiments and forces applied to an ink droplet.

FIG. 8A is a diagram for explaining an ink droplet discharged by a nozzle according to a conventional method, and FIG. 8A is a diagram for explaining an ink droplet discharged by a nozzle according to some embodiments.

Referring to FIG. 8A, the nozzle 720 according to the conventional method using the piezoelectricity may discharge the ink droplet 740 on the substrate 730. To the ink droplet 740, a pressure PA1, static electricity PA2, and a surface tension PA3 that are applied from the nozzle 720 may be applied. Due to the pressure PA1, the static electricity PA2, and the surface tension PA3, the ink droplet 740 may have a round shape.

The Ink droplet 741 is listed with a time sequence for the shape of the ink droplet 740 discharged from the nozzle 720 when being viewed from the side. Referring to the ink droplet 741, the diameter of the ink droplet 740 may be expressed as "R1".

Referring to FIG. 8B, the nozzle 820 according to some embodiments using the EHD phenomenon may discharge the ink droplet 840 on the substrate 830. To the ink droplet 840, the gravity PB1 from top to bottom, the viscosity stress PB2, the electrical polarization stress PB3, the surface tension PB4 applied from the outside to the inside of the ink surface, the normal electrical stress PB5 in the direction perpendicular to the surface, and the tangential regular stress PB6 in a direction parallel to the surface may be applied. Due to the gravity PB1, the viscosity stress PB2, the electrical polarization stress PB3, the surface tension PB4, the normal electrical stress PB5, and the tangential periodic stress PB6, the ink droplet 840 may take the shape of a cone pointed downward.

The ink droplet 841 is listed with a time sequence for the shape of the ink droplet 840 discharged from the nozzle 820 when being viewed from the side. Referring to the ink droplet 841, the diameter of the ink droplet 840 may be expressed as "R2".

Because R2 is smaller than R1, the printing devices 200, 300, 400, 500, and 600 according to some embodiments may form the size of the droplets discharged from the nozzles 220, 320, 420, 520, and 620 more finely. Therefore, the printing devices 200, 300, 400, 500, and 600 according to some embodiments may improve the precision of the printing and make the printing thickness uniform compared to the conventional method.

According to some embodiments, because the printing device uses a resonance circuit, soft switching (zero switching) may be possible. Therefore, because the printing device does not have a voltage spike through implementation of ZVS (zero voltage switching) and ZCS (zero current switching), a noise is suppressed and system interference according to a high voltage may be minimized. Also, according to some embodiments, the printing device may be a device with the improved amplitude gain and response characteristic compared to a printing device that does not include a resonance circuit.

Hereinafter, the method to control the printing device according to FIG. 1, FIG. 2, and FIG. 4 to FIG. 7 is described with reference to FIG. 9.

Figure 9:
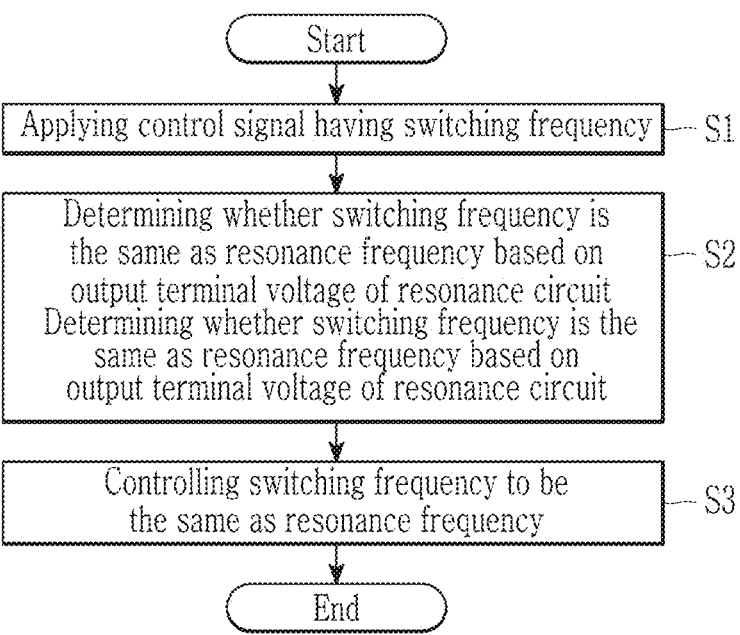
FIG. 9 is a flowchart showing a method for controlling a printing device according to some embodiments.

FIG. 9 is a flowchart showing a method for controlling a printing device according to some embodiments. For convenience of explanation, it is described with reference to the printing device 200 of FIG. 2. Although various operations are shown in FIG. 9, the number and order of operations may vary according to various embodiments. For example, some embodiments may include additional operations or fewer operations, or the order of the operations may vary (unless otherwise stated or implied) without departing from the spirit and scope of embodiments according to the present disclosure.

The control circuit 260 may apply a control signal CS having a switching frequency fs to the input power source VS (S1).

The input power source VS may be implemented with a voltage source 250, a first transistor Q1, a second transistor Q2, a first buffer BF1, a second buffer BF2, and an inverter IN.

The control signal CS may control the switching operation of the first transistor Q1 and the second transistor Q2 through the first buffer BF1, the second buffer BF2, and the inverter IN. When the control signal CS is an on-level signal, the first transistor Q1 may be turned on and the second transistor Q2 may be turned off. When the control signal CS is an off-level signal, the first transistor Q1 may be turned off and the second transistor Q2 may be turned on.

The first transistor Q1 may be turned on by the control signal CS supplied through the first buffer BF1, and the second transistor Q2 may be turned on by the control signal CS supplied through the inverter IN and the second buffer BF2. Because the inverter is not connected to the input terminal of the first buffer BF1 and the inverter IN is connected to the input terminal of the second buffer BF2, the first transistor Q1 and the second transistor Q2 may be alternately turned on. When the first transistor Q1 is turned on and the second transistor Q2 is turned off, a voltage is applied to the resonance circuit 210 from the voltage source 250. When the second transistor Q2 is turned on and the first transistor Q1 is turned off, the input terminals I1 and 12 are short circuited in operation, and each of the input terminals I1 and 12 may be connected to the ground. When the second transistor Q2 is turned on and the first transistor Q1 is turned off, the ground voltage may be applied to the resonance circuit 210.

The resonance circuit 210 may include passive elements. The resonance circuit 210 may output an output terminal voltage VR that amplifies the amplitude of the voltage source 250 by an amplitude gain at the resonance frequency of the passive elements.

The resonance circuit 210 may be any one of the resonance circuit 310 of FIG. 4, the resonance circuit 410 of FIG. 5, the resonance circuit 510 of FIG. 6, and the resonance circuit 610 of FIG. 7.

Hereinafter, for convenience of description, the switching frequency fs, which is the first frequency, is referred to as the first switching frequency fs1, and the switching frequency fs, which is the second frequency, is referred to as the second switching frequency fs2.

The control circuit 260 may determine whether the first switching frequency fs1 is the same as the resonance frequency fr based on the output terminal voltage signals VO1 and VO2 for the control signal CS of the first switching frequency fs1 (S2).

The control circuit 260 may receive the output terminal voltage signals VO1 and VO2 of the resonance circuit 210. Each of the output terminal voltage signals VO1 and VO2 may indicate the voltage of each of the output terminals O1 and O2 of the resonance circuit 210. The control circuit 260 may detect the resonance frequency fr based on the output terminal voltage signals VO1 and VO2 of the resonance circuit 210. For example, the control circuit 260 may compare the output terminal voltage signals VO1 and VO2 according to the first switching frequency fs1 with the output terminal voltage signals VO1 and VO2 according to the second switching frequency fs2 to find the resonance frequency fr.

The first frequency may be predetermined as initial information based on values of passive elements of the resonance circuit 210. For example, the first frequency may be determined based on at least one inductance value of at least one inductor included in the resonance circuit 210 and at least one capacitance value of at least one capacitor.

The second frequency may be a frequency within a predetermined range based on the first frequency. For example, the second frequency may belong to a range of greater than or equal to a frequency reduced by 10% based on the first frequency and less than a frequency increased by 10% based on the first frequency.

The control circuit 260 may determine whether the first frequency, which is the switching frequency fs, and the resonance frequency fr, are the same by the comparison.

The control circuit 260 may control the switching frequency fs to be equal to the resonance frequency fr S3.

If the first frequency, which is the switching frequency fs, and the resonance frequency fr, are not equal to each other, the control circuit 260 may control the switching frequency fs to be equal to the resonance frequency fr by increasing or decreasing the switching frequency fs. When the first frequency, which is the switching frequency fs, and the resonance frequency fr, are equal to each other, the control circuit 260 may maintain the switching frequency fs without increasing or decreasing. The resonance circuit 210 may supply the resonance voltage between the nozzle and the substrate according to the input power source VS supplied with the switching frequency fs controlled to be equal to the resonance frequency fr.

While aspects of some embodiments of the present invention have been described in connection with what is presently considered to be practical embodiments, it is to be understood that embodiments according to the present invention are not limited to the disclosed embodiments. On the contrary, it is intended to cover various modifications and equivalent arrangements included within the spirit and scope of the appended claims, and their equivalents.

DESCRIPTION OF SOME OF THE REFERENCE SYMBOLS 100, 200, 300, 400, 500, 600: printing device
110, 210, 310, 410, 510, 610: resonance circuit
120, 220, 320, 420, 520, 620, 720, 820: nozzle
130, 230, 330, 430, 530, 630, 730, 830: substrate
140, 240, 340, 440, 540, 640, 740, 741, 840, 841: ink droplet
260: control circuit

What is claimed is:
1. A printing device comprising:
a DC power source;
a resonance circuit including an inductor and a capacitor, the resonance circuit having a resonance frequency that is a first frequency;
a nozzle connected to the resonance circuit and configured to discharge ink droplets to a substrate;

a first transistor configured to be turned on according to a control signal having a same frequency as the first frequency and configured to transmit the DC power source to the resonance circuit; and
a second transistor configured to connect input terminals of the resonance circuit to a ground based on being turned on according to an inverted signal from the control signal.
2. The printing device of claim 1, wherein
a first terminal of the first transistor is connected to the DC power source,
a second terminal of the first transistor is connected to a first input terminal of the resonance circuit and a first terminal of the second transistor, and
a second terminal of the second transistor is connected to a second input terminal of the resonance circuit and the ground.
3. The printing device of claim 2, wherein
the resonance circuit includes the inductor and the capacitor coupled in series with each other,
a first terminal of the inductor is connected to the second terminal of the first transistor,
a second terminal of the inductor is connected to a first terminal of the capacitor, and
a second terminal of the capacitor is connected to the ground.
4. The printing device of claim 2, wherein
the resonance circuit includes first and second inductors and the capacitor coupled in series to each other,
a first terminal of the first inductor is connected to the second terminal of the first transistor,
the second terminal of the first inductor is connected to a first terminal of the second inductor,
a second terminal of the second inductor is connected to a first terminal of the capacitor, and
a second terminal of the capacitor is connected to a ground.
5. The printing device of claim 4, wherein
a first terminal of the second inductor is electrically connected to the nozzle, and
a second terminal of the capacitor is electrically connected to the substrate.
6. The printing device of claim 4, wherein
the first terminal of the capacitor is electrically connected to the nozzle, and
the second terminal of the capacitor is electrically connected to the substrate.
7. The printing device of claim 4, wherein
the first terminal of the second inductor is electrically connected to the nozzle, and
the second terminal of the second inductor is electrically connected to the substrate.
8. The printing device of claim 1, wherein
based on the control signal being an on-level signal, the first transistor is configured to be turned on and the second transistor is configured to be turned off, and
based on the control signal being an off-level signal, the second transistor is configured to be turned on and the first transistor is configured to be turned off.
9. A control method for controlling a printing device, the printing device including:
a DC power source;
a resonance circuit including an inductor and a capacitor and having a resonance frequency that is a first frequency;
a nozzle configured to discharge an ink droplet on a substrate; and first and second transistors configured to supply the DC power source to the resonance circuit according to a control signal, the method comprising:

applying a control signal having a second frequency as a switching frequency;

determining whether or not the second frequency is equal to the first frequency based on an output terminal voltage signal of the resonance circuit; and increasing or decreasing the switching frequency to control the switching frequency to be equal to the first frequency if the second frequency is not equal to the first frequency.

10. The control method of claim 9, wherein applying the control signal comprises:

supplying the DC power source to input terminals of the resonance circuit based on the first transistor being turned on by the control signal;

outputting an inverted signal from the control signal through an inverter; and connecting the input terminals of the resonance circuit to a ground based on the second transistor being turned on by the inverted signal.

11. The control method of claim 9, wherein applying the control signal comprises:

connecting a first terminal of an inductor to a first input terminals of the resonance circuit;

connecting a first terminal of a capacitor to a second terminal of the inductor; and connecting a second input terminal of the resonance circuit to a second terminal of the capacitor.

12. The control method of claim 9, wherein applying the control signal comprises:

connecting a first terminal of a first inductor to a first input terminals of the resonance circuit;

connecting a first terminal of a second inductor to a second terminal of the first inductor;

connecting a first terminal of a capacitor to a second terminal of the second inductor;

connecting a second input terminal to a second terminal of the capacitor;

connecting a first terminal of the second inductor to a first output terminal of the resonance circuit; and connecting a second terminal of the capacitor to a second output terminal of the resonance circuit.

13. The control method of claim 9, wherein applying the control signal comprises:

connecting a first terminal of a first inductor to a first input terminal of the resonance circuit;

connecting a first terminal of a second inductor to a second terminal of the first inductor;

connecting a first terminal of a capacitor to a second terminal of the second inductor;

connecting a second input terminal to a second terminal of the capacitor; and connecting both terminals of the capacitor to output terminals of the resonance circuit.

14. The control method of claim 9, wherein applying the control signal comprises:

connecting a first terminal of a first inductor to a first input terminal of the resonance circuit;

connecting a first terminal of a second inductor to a second terminal of the first inductor;

connecting a first terminal of the capacitor to a second terminal of the second inductor;

connecting a second input terminal to a second terminal of the capacitor; and connecting both terminals of the second inductor to output terminals of the resonance circuit.

* * * * *